(12) United States Patent
Chen et al.

(10) Patent No.: US 12,155,327 B2
(45) Date of Patent: Nov. 26, 2024

(54) METHOD FOR CONTROLLING MULTI-MOVER DIRECT DRIVE TRANSMISSION SYSTEM AND RELATED DEVICE

(71) Applicant: AAC Microtech (Changzhou) Co., Ltd., Changzhou (CN)

(72) Inventors: Min Chen, Shenzhen (CN); Xueyuan Zhu, Shenzhen (CN); Shun Guo, Shenzhen (CN); Lin Qian, Shenzhen (CN); Weiling Shi, Shenzhen (CN); Wanlun Wang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/918,549

(22) PCT Filed: Jul. 28, 2022

(86) PCT No.: PCT/CN2022/108444
§ 371 (c)(1),
(2) Date: Oct. 12, 2022

(87) PCT Pub. No.: WO2024/000711
PCT Pub. Date: Jan. 4, 2024

(65) Prior Publication Data
US 2024/0213901 A1 Jun. 27, 2024

(30) Foreign Application Priority Data
Jun. 30, 2022 (CN) .......................... 202210777097.1

(51) Int. Cl.
*H02K 7/14* (2006.01)
*B65G 43/10* (2006.01)
(Continued)

(52) U.S. Cl.
CPC .............. *H02P 25/06* (2013.01); *B65G 43/10* (2013.01); *H02P 23/12* (2013.01); *H02P 23/14* (2013.01)

(58) Field of Classification Search
CPC ......... H02K 7/14; H02P 25/064; H02P 23/12; H02P 23/14; H02P 25/06
See application file for complete search history.

(56) References Cited

U.S. PATENT DOCUMENTS

| | | | |
|---|---|---|---|
| 2018/0248498 A1* | 8/2018 | Piitulainen | H02P 25/064 |
| 2020/0030995 A1* | 1/2020 | Lu | H02K 7/14 |

\* cited by examiner

*Primary Examiner* — Cortez M Cook
(74) *Attorney, Agent, or Firm* — W&G Law Group

(57) ABSTRACT

A method for controlling a multi-mover direct drive transmission system and related devices, including: S1: detecting a real-time position of the mover units movable in the feedback segments; S2: determining whether the mover unit enters junction region between the feedback and transition segments: if yes, calculating, by using preset algorithm, an electrical angle at which the mover unit moves in the transition segment, and determining real-time position of the mover unit through the electrical angle; and setting cooperative control mode of the stator windings in a range of the transition segment according to the real-time position of the mover unit; and S3: determining whether the mover unit enters the junction region between the transition segment and the feedback segment: if yes, feeding back real-time position of the mover unit through the displacement sensor of the feedback segment. The above solution has a good control effect, low costs, and low mounting requirements.

10 Claims, 4 Drawing Sheets

(51) Int. Cl.
*H02P 23/12* (2006.01)
*H02P 23/14* (2006.01)
*H02P 25/06* (2016.01)

METHOD FOR CONTROLLING MULTI-MOVER DIRECT DRIVE TRANSMISSION SYSTEM AND RELATED DEVICE

TECHNICAL FIELD

The present disclosure relates to the technical field of transmission system control, and in particular, to a method for controlling a multi-mover direct drive transmission system and related devices.

BACKGROUND

A multi-mover direct drive transmission system is applied to production line and pipeline transfer in unmanned occasions. An existing multi-mover direct drive transmission system includes a stator unit and a plurality of mover units movable relative to the stator unit. The stator unit includes a stator body and a plurality of stator windings mounted on the stator body and sequentially arranged along an extending direction of the stator body. Each of the mover units includes a mover sliding relative to the stator body and a magnet fixed to the mover.

In the multi-mover direct drive transmission system in the related art, the stator body of the stator unit is classified into linear segments, circular segments or a combination of linear segments and circular segments. Displacement sensors (encoder arrays) are arranged in different segment ranges to identify the position of each mover. For example, displacement sensors (encoder arrays) are arranged in the linear segments and the circular segments of the multi-mover direct drive transmission system to identify the position of each mover unit, so as to accurately control each mover unit.

However, in the multi-mover direct drive transmission system in the related art, the displacement sensor is required to be mounted at a position of any stator winding corresponding to the stator body. The mounting is complex, but the positions of the mover units are not required to be accurately controlled in all segment ranges during actual application. Some stations corresponding to the stator unit only require simple transition without the need to position the mover units, and thus requires no displacement sensor for accurate control, which leads to high costs of the method for controlling a multi-mover direct drive transmission system.

Therefore, there is a need to provide a new method for controlling a multi-mover direct drive transmission system and related devices to solve the above problems.

SUMMARY

A method for controlling a multi-mover direct drive transmission system and related devices according to embodiments of the present disclosure are intended to solve the problems of high costs and high mounting requirements in the related art.

In a first aspect, an embodiment of the present disclosure provides a method for controlling a multi-mover direct drive transmission system, the multi-mover direct drive transmission system includes a stator unit and mover units movable relative to the stator unit, the stator unit includes a stator body, a track mounted on the stator body, and stator windings mounted on the stator body and sequentially arranged along an extending direction of the stator body, each of the mover units includes a mover slidably connected to the track and movable relative to the stator body and a magnet fixed to the mover; the stator body includes alternating feedback segments and transition segments, and displacement sensors mounted on the feedback segments, and each of the displacement sensors is arranged corresponding to one of the stator windings. The method includes the following steps: S1: detecting, in real time, a real-time position of one of the mover units movable in a corresponding one of the feedback segments; S2: determining, in real time, whether the mover unit enters a junction region between the feedback segment and the transition segment adjacent thereto: if yes, calculating, by using a preset algorithm, an electrical angle at which the mover unit moves in the transition segment, and determining a real-time position of the mover unit through the electrical angle; and setting a cooperative control mode of each of the stator windings in a range of the transition segment according to the real-time position of the mover unit; and S3: determining, in real time, whether the mover unit enters the junction region between the transition segment and the feedback segment: if yes, feeding back a real-time position of the mover unit in real time through the displacement sensor of the feedback segment.

As an improvement, in step S2: along a motion direction of the mover unit, determining that the mover unit enters the junction region between the feedback segment and the transition segment when a feedback of a final stator winding of the stator windings in the feedback segment reaches a first specific value.

As an improvement, in step S2, the calculating, by using a preset algorithm, an electrical angle at which the mover unit moves in the transition segment includes: S21: calculating, by using a preset non-inductive algorithm, back electromotive force generated by a corresponding stator winding of the stator windings when the mover unit enters the transition segment and moves in the transition segment; and S22: calculating a real-time electrical angle by using a preset electrical angle extraction algorithm according to the back electromotive force.

As an improvement, the non-inductive algorithm is one of a sliding mode algorithm, a model reference adaptive algorithm, a state observer algorithm, a Kalman filter algorithm, or a Luenberger observation algorithm.

As an improvement, the electrical angle extraction algorithm is one of a phase-locked loop algorithm or a direct calculation algorithm.

As an improvement, in step S2, the cooperative control mode is one of master-slave control or switching of a master-slave control mode.

As an improvement, in step S3: along a motion direction of the mover unit, determining that the mover unit enters the junction region between the transition segment and the feedback segment when a feedback of a first stator winding in the feedback segment and adjacent to a final stator winding in the transition segment reaches a second specific value.

As an improvement, each of the displacement sensors is an encoder array.

In a second aspect, an embodiment of the present disclosure further provides a computer device, including: a memory, a processor, and a computer program stored on the memory and executable by the processor, when executing the computer program, the processor is configured to implement the method for controlling a multi-mover direct drive transmission system in the above embodiments.

In a third aspect, an embodiment of the present disclosure further provides a non-transitory storage medium storing a computer program, when executed by a processor, the computer program causes the processor to implement the method for controlling a multi-mover direct drive transmission system in the above embodiments.

Compared with the related art, in the method for controlling a multi-mover direct drive transmission system and the related devices of the present disclosure, the stator body is arranged as alternating feedback segments and transition segments, a plurality of displacement sensors are mounted on the feedback segments, each of the displacement sensors is arranged corresponding to one of the stator windings, by determining in real time that the mover units move in the feedback segments or the transition segments, accurate position feedback and control are performed in the feedback segments through the displacement sensors, while in the transition segments, the corresponding stator windings generate back electromotive force through the mover units to calculate electrical angles to determine real-time positions of the mover units, so as to achieve an overall control effect. The control method and the related devices effectively reduce mounting and use of the displacement sensors, reduce mounting requirements, and reduce costs due to omission of the mounting of the displacement sensors in the transition segments.

BRIEF DESCRIPTION OF DRAWINGS

In order to better illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

The technical solutions in the embodiments of the present disclosure will be described below with reference to the accompanying drawings in the embodiments of the present disclosure. It is appreciated that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
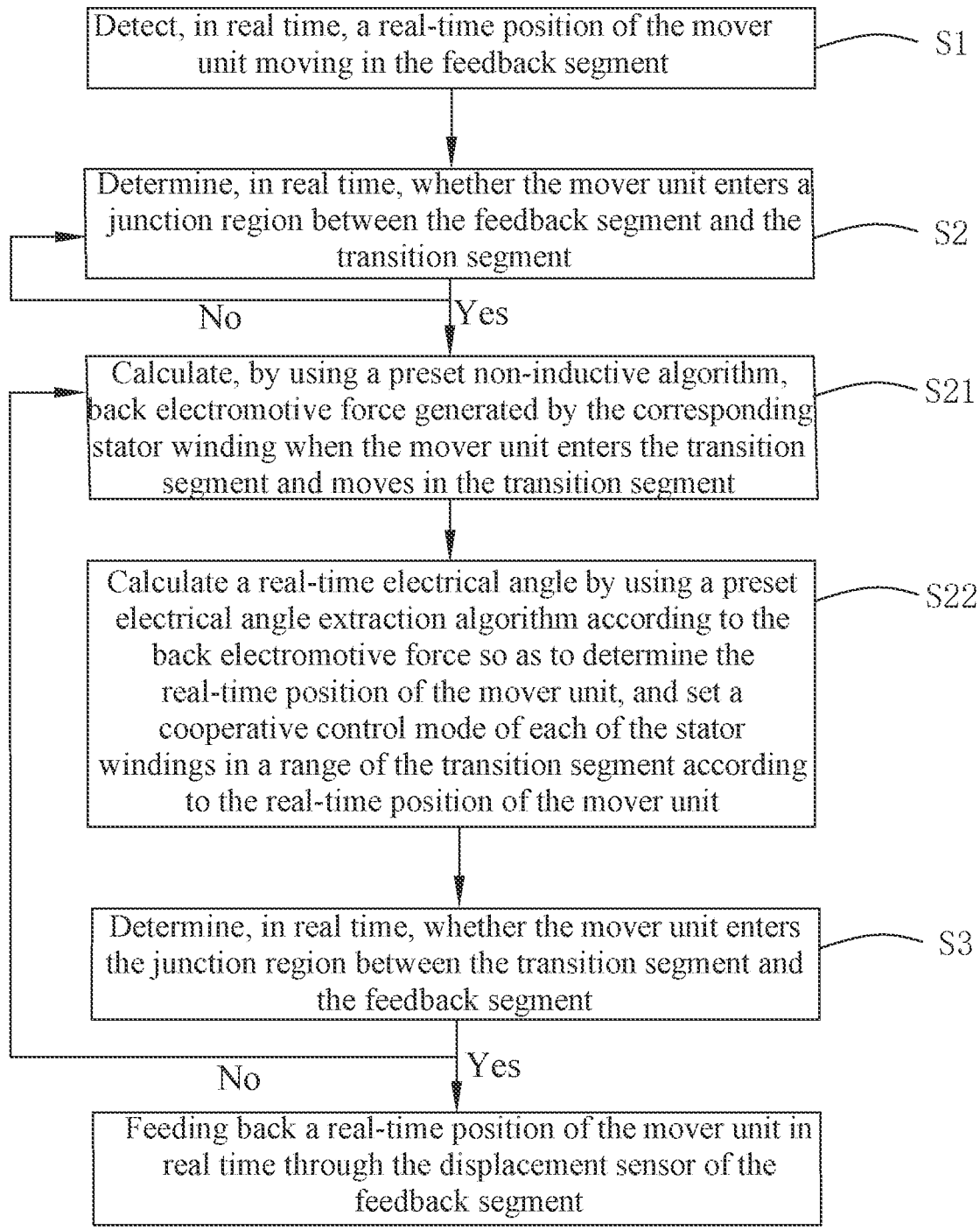
FIG. 1 is a flow diagram of a method for controlling a multi-mover direct drive transmission system according to an embodiment of the present disclosure.
Figure 2:
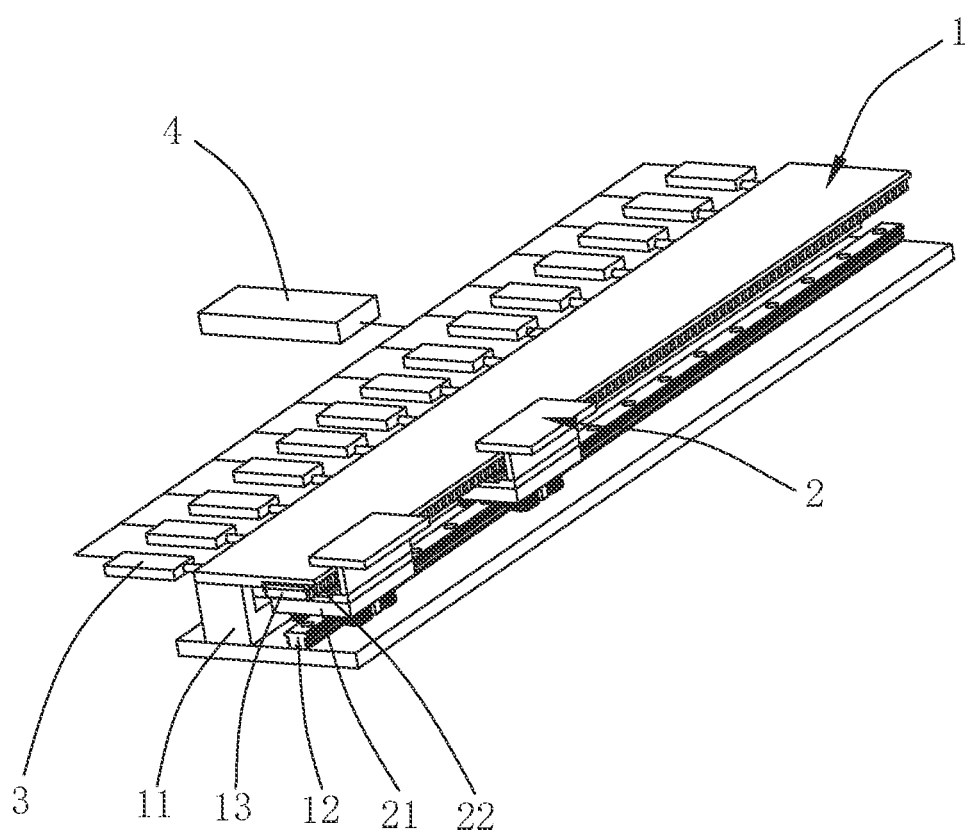
FIG. 2 is a schematic diagram of a partial three-dimensional structure of a multi-mover direct drive transmission system according to an embodiment of the present disclosure.

Referring to FIG. 1 to FIG. 2, an embodiment of the present disclosure provides a method for controlling a multi-mover direct drive transmission system, for controlling the position of the multi-mover direct drive transmission system 100. As shown in FIG. 2, the multi-mover direct drive transmission system 100 includes a stator unit 1, a plurality of mover units 2 moving relative to the stator unit 1, a plurality of actuators 3 respectively connected to each segment of the stator unit 1, and a controller 4 connected to all the actuators 3.

The stator unit 1 includes a stator body 11, a track 12 mounted on the stator body 11, and a plurality of stator windings 13 (or referred to as winding coils) mounted on the stator body 11 and sequentially arranged along an extending direction of the stator body 11. The stator body 11 includes alternating feedback segments (unlabeled) and transition segments (unlabeled) and a plurality of displacement sensors (unlabeled) mounted on the feedback segments. Each of the displacement sensors is arranged corresponding to one of the stator windings 13.

In this embodiment, each of the displacement sensors is an encoder array.

The stator body 11 may include a plurality of feedback segments and a plurality of transition segments which are alternately arranged.

Each of the mover units 2 includes a mover 21 slidably connected to the track 12 and movable relative to the stator body 11 and a magnet 22 fixed to the mover 21. The stator winding 13 is energized to generate an electromagnetic field with the magnet 22, so as to drive the magnet 22 to move and drive the mover 21 to move.

The control method includes the following steps.

In step S1, a real-time position of the mover unit 2 movable in the feedback segment is detected in real time.

When the mover unit 2 moves in a range of the feedback segment, accurate position control is performed through the corresponding displacement sensor.

In step S2, it is determined, in real time, whether the mover unit 2 enters a junction region between the feedback segment and the transition segment:

If no, it is determined that the mover unit 2 still moves in the range of the feedback segment, a real-time accurate position is detected through the displacement sensor corresponding to each of the stator winding 13 arranged in the feedback segment and fed back to the controller 4, the controller 4 generates control information according to feedback information based on a preset control strategy and transmits the control information to the actuator 3, and the actuator 3 causes the corresponding stator winding 13 to generate driving force and drives the mover unit 2 to continue moving. It is continuously determined, in real time, whether the mover unit 2 enters a junction region between the feedback segment and the transition segment.

If yes, an electrical angle at which the mover unit 2 moves in the transition segment is calculated by using a preset algorithm, and a real-time position of the mover unit 2 is determined through the electrical angle. A cooperative control mode of each of the stator windings 13 in a range of the transition segment is set according to the real-time position of the mover unit 2 so as to realize motion and position calculation of the mover unit 2 in the range of the transition segment.

The cooperative control mode is either of master-slave control or switching of a master-slave control mode. In this embodiment, the cooperative control mode is optionally switching of the master-slave control mode.

In an actual production line, the transition segment generally corresponds to a station that does not require high position feedback or does not require position feedback, while the feedback segment corresponds to a station that requires accurate control over position feedback.

When the mover unit 2 movers into the region of the transition segment, the mover unit 2 still keeps an initial velocity in previous motion. The magnet 22 on the mover unit 2 is driven to move above the corresponding stator winding 13 by the initial velocity, and the stator winding 13 induces back electromotive force.

A method for determining whether the mover unit 2 enters a junction region between the feedback segment and the transition segment involves: along a motion direction of the mover unit 2, determining that the mover unit 2 enters the junction region between the feedback segment and the transition segment (i.e., the mover unit 2 enters the transition segment) when a feedback of the final stator winding 13 in the feedback segment reaches a first specific value a. Next, the mover unit 2 may move in the region of the transition segment.

The calculating, by using a preset algorithm, an electrical angle at which the mover unit 2 moves in the transition segment specifically includes the following substeps.

In step S21, back electromotive force generated by the corresponding stator winding 13 is calculated by using a preset non-inductive algorithm when the mover unit 2 enters the transition segment and moves in the transition segment.

The non-inductive algorithm may be any one of a sliding mode algorithm, a model reference adaptive algorithm, a state observer algorithm, a Kalman filter algorithm, and a Luenberger observation algorithm. In this embodiment, the non-inductive algorithm is optionally the sliding mode algorithm.

In step S22, a real-time electrical angle is calculated by using a preset electrical angle extraction algorithm according to the back electromotive force.

The real-time electrical angle may be used to determine the real-time position of the mover unit 2.

A cooperative control mode of each of the stator windings 13 in a range of the transition segment is set according to the real-time position of the mover unit 2 so as to realize motion and position calculation of the mover unit 2 in the range of the transition segment.

The electrical angle extraction algorithm is either a phase-locked loop algorithm or a direct calculation algorithm. In this embodiment, the electrical angle extraction algorithm is optionally the phase-locked loop algorithm.

In step S3, it is determined, in real time, whether the mover unit 2 enters the junction region between the transition segment and the feedback segment: if yes, a real-time position of the mover unit is fed back in real time through the displacement sensor of the feedback segment. If no, steps S21 and S22 are continued, and it is continuously determined, in real time, whether the mover unit 2 enters the junction region between the transition segment and the feedback segment.

In this step, along a motion direction of the mover unit 2, it is determined that the mover unit 2 enters the junction region between the transition segment and the feedback segment (i.e., the mover unit 2 enters the feedback segment) when a feedback of the first stator winding 13 in the feedback segment and adjacent to the final stator winding 13 in the transition segment reaches a second specific value b, and then moves in the feedback segment. The mover unit moves according to an original preset accurate control strategy when moving in the feedback segment. The accurate control strategy according to which a specific position is fed back in real time by the displacement sensor when the mover unit moves in the feedback segment is not specifically described herein.

It is to be noted that the first specific value and the second specific value may be set according to requirements of an actual situation, and format and magnitude thereof are not limited herein, which shall be easily understood by those of ordinary skill in the art based on the present disclosure.

Figure 3:
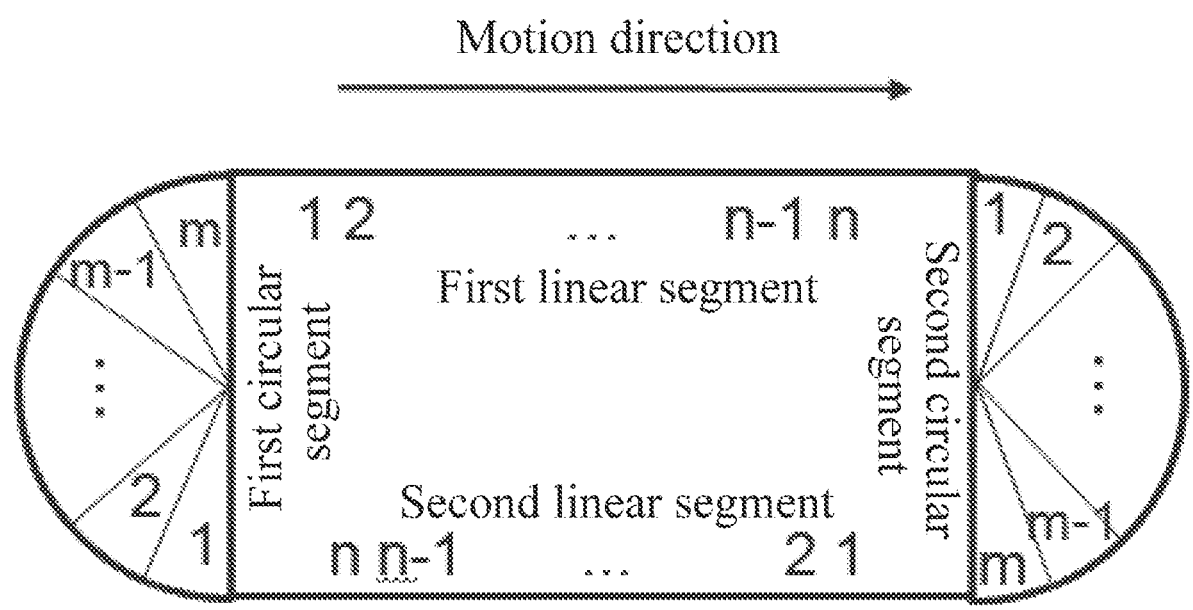
FIG. 3 is a schematic diagram of an embodiment of a method for controlling a multi-mover direct drive transmission system according to an embodiment of the present disclosure.

Referring to FIG. 3, the present disclosure provides embodiments for further description.

For example, the stator body 11 is in a shape of a circular racetrack, which is formed by splicing two linear segments and two circular segments. The linear segments are arranged as the feedback segments in the present disclosure, that is, position sensors are mounted in the linear segments. The circular segments are the transition segments in the present disclosure, that is, no position sensor is mounted. Each linear segment is formed by 1 to n linear stator windings closely arranged. Each circular segment is formed by 1 to m circular stator windings closely arranged.

When the mover unit moves in a forward direction, it is determined that the mover unit enters a region of a first circular segment when a position feedback of an nth stator of a first linear segment connected to the first circular segment reaches the first specific value a.

The mover unit still keeps the initial velocity in previous motion when just entering the first circular segment. The magnet on the mover unit is driven to move above the corresponding stator winding by the initial velocity, and the stator winding induces back electromotive force.

The controller uses a preset algorithm (such as a sliding mode algorithm) to estimate the back electromotive force and uses a preset algorithm (such as a phase-locked loop algorithm) to calculate real-time electrical angle information. The real-time position of the mover unit may be determined through the real-time electrical angle information.

Cooperative control (such as switching of a master-slave control mode) over different stator units in the region of the first circular segment is performed according to the real-time position of the mover unit estimated in real time. Thus, a specific real-time position of the mover unit in the region of the first circular segment is calculated.

Similarly, it is determined that the mover unit enters a control region of a second linear segment when it is detected that a position feedback of the first stator winding of the second linear segment connected to (or adjacent to) the end of the first circular segment reaches the second specific value b. The motion of the mover unit in the region of the second linear segment is controlled according to accurate position control.

Compared with the related art, in the method for controlling a multi-mover direct drive transmission system of the present disclosure, the stator body is arranged as alternating feedback segments and transition segments, a plurality of displacement sensors are mounted on the feedback segments, each of the displacement sensors is arranged corresponding to one of the stator windings, by determining in real time that the mover units move in the feedback segments or the transition segments, accurate position feedback and control are performed in the feedback segments through the displacement sensors. While in the transition segments, the corresponding stator windings generate back electromotive force through the mover units to calculate electrical angles to determine real-time positions of the mover units, so as to achieve an overall control effect. The control method and the related devices effectively reduce mounting and use of the displacement sensors, reduce mounting requirements, and reduce costs due to omission of the mounting of the displacement sensors in the transition segments.

Figure 4:
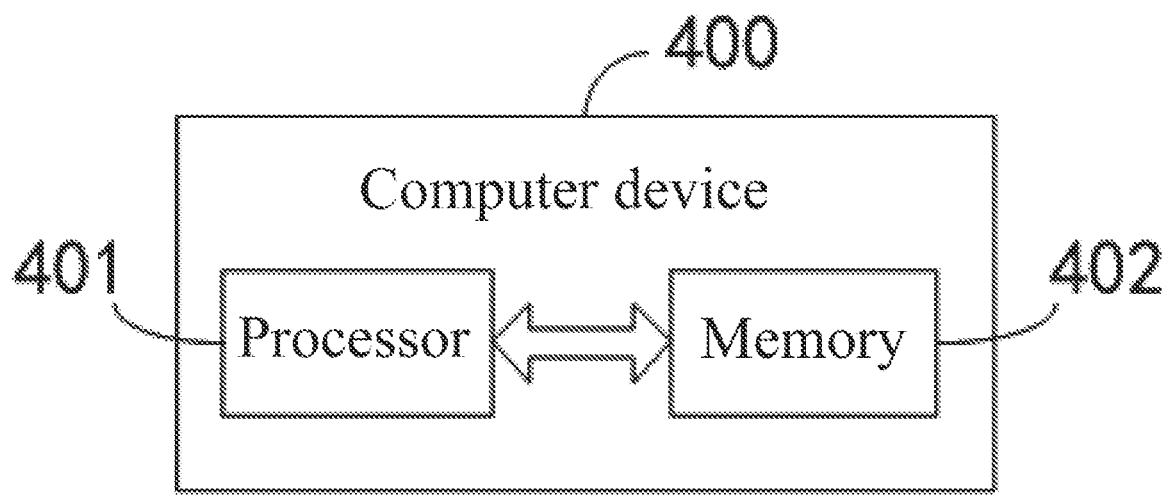
FIG. 4 is a schematic structural diagram of a computer device according to an embodiment of the present disclosure.

An embodiment of the present disclosure further provides a computer device. Refer to FIG. 4 which is a schematic structural diagram of a computer device according to an embodiment of the present disclosure. The computer device 400 includes: a memory 402, a processor 401, and a computer program stored on the memory 402 and executable by the processor 401.

The computer device 400 is equivalent to the controller in the multi-mover direct drive transmission system according to the above embodiments of the present disclosure.

The processor 401 calls the computer program stored in the memory 402 to implement steps in the method for controlling a multi-mover direct drive transmission system in the above embodiment when executing the computer program.

The computer device 400 according to embodiments of the present disclosure can implement the steps in the method for controlling a multi-mover direct drive transmission system in the above embodiments, and can achieve the same technical effect, please refer to the description in the above embodiments.

An embodiment of the present disclosure further provides a non-transitory storage medium. The non-transitory storage medium stores a computer program. The computer program, when executed by a processor, causes the processor to implementing various processes and steps in the method for controlling a multi-mover direct drive transmission system according to embodiments of the present disclosure, and can achieve the same technical effect. Details are not described herein so as to avoid repetition.

Those of ordinary skill in the art may understand that some or all procedures in the methods in the foregoing embodiments may be implemented by a computer program instructing related hardware, the program may be stored in a non-transitory storage medium, and when the program is executed, the procedures in the foregoing method embodiments may be implemented. The storage medium may be a magnetic disk, an optical disk, a Read-Only Memory (ROM), a Random Access Memory (RAM), or the like.

It is to be noted that the terms such as "comprise", "include" or other variations thereof are intended to cover a non-exclusive inclusion, for example, processes, methods, items or apparatuses including a series of elements are not limited to these elements listed explicitly, but rather include other elements not listed explicitly, or other elements inherent to these processes, methods, items or apparatuses. In the absence of further limitations, elements defined by the statement "include a/an . . . " do not preclude the existence of additional identical elements in the processes, methods, items or apparatuses including the elements.

Through the descriptions of the above embodiments, it is clear to those skilled in the art that the present disclosure may be implemented by software and a necessary universal hardware platform or by hardware, but in many cases the former is preferred. Based on such understanding, the technical solutions in the present disclosure essentially, or the part contributing to the related art may be implemented in a form of a software product. The computer software product is stored in a storage medium (e.g., an ROM/RAM, a magnetic disk, or an optical disk), and includes several instructions for instructing a terminal (which may be a mobile phone, a computer, a server, an air conditioner, a network device, or the like) to perform the methods described in the embodiments of the present disclosure.

The above are only embodiments of the present disclosure and not thus intended to limit the patent scope of the present disclosure. All equivalent structures or equivalent flow transformations made by virtue of contents of the specification and the drawings of the present disclosure or direct or indirect application to the other related technical fields shall fall within the protection scope of the present disclosure.

What is claimed is:

1. A method for controlling a multi-mover direct drive transmission system, wherein the multi-mover direct drive transmission system comprises a stator unit and mover units movable relative to the stator unit, the stator unit comprises a stator body, a track mounted on the stator body, and stator windings mounted on the stator body and sequentially arranged along an extending direction of the stator body, each of the mover units comprises a mover slidably connected to the track and movable relative to the stator body and a magnet fixed to the mover; wherein the stator body comprises alternating feedback segments and transition segments, and displacement sensors mounted on the feedback segments, and each of the displacement sensors is arranged corresponding to one of the stator windings, wherein the method comprises:
S1: detecting, in real time, a real-time position of one of the mover units movable in a corresponding one of the feedback segments;
S2: determining, in real time, whether the mover unit enters a junction region between the feedback segment and the transition segment adjacent thereto: if yes, calculating, by using a preset algorithm, an electrical angle at which the mover unit moves in the transition segment, and determining a real-time position of the mover unit through the electrical angle; and setting a cooperative control mode of each of the stator windings in a range of the transition segment according to the real-time position of the mover unit; and
S3: determining, in real time, whether the mover unit enters the junction region between the transition segment and the feedback segment: if yes, feeding back a real-time position of the mover unit in real time through the displacement sensor of the feedback segment.

2. The method for controlling a multi-mover direct drive transmission system according to claim 1, wherein, in step S2:
along a motion direction of the mover unit, determining that the mover unit enters the junction region between the feedback segment and the transition segment when a feedback of a final stator winding of the stator windings in the feedback segment reaches a first specific value.

3. The method for controlling a multi-mover direct drive transmission system according to claim 1, wherein, in step S2, the calculating, by using a preset algorithm, an electrical angle at which the mover unit moves in the transition segment comprises:
S21: calculating, by using a preset non-inductive algorithm, back electromotive force generated by a corresponding stator winding of the stator windings when the mover unit enters the transition segment and moves in the transition segment; and
S22: calculating a real-time electrical angle by using a preset electrical angle extraction algorithm according to the back electromotive force.

4. The method for controlling a multi-mover direct drive transmission system according to claim 3, wherein the non-inductive algorithm is one of a sliding mode algorithm, a model reference adaptive algorithm, a state observer algorithm, a Kalman filter algorithm, or a Luenberger observation algorithm.

5. The method for controlling a multi-mover direct drive transmission system according to claim 3, wherein the electrical angle extraction algorithm is one of a phase-locked loop algorithm or a direct calculation algorithm.

6. The method for controlling a multi-mover direct drive transmission system according to claim 1, wherein, in step S2, the cooperative control mode is one of master-slave control or switching of a master-slave control mode.

7. The method for controlling a multi-mover direct drive transmission system according to claim 1, wherein, in step S3:

along a motion direction of the mover unit, determining that the mover unit enters the junction region between the transition segment and the feedback segment when a feedback of a first stator winding in the feedback segment and adjacent to a final stator winding in the transition segment reaches a second specific value.

8. The method for controlling a multi-mover direct drive transmission system according to claim 1, wherein each of the displacement sensors is an encoder array.

9. A computer device, comprising: a memory, a processor, and a computer program stored on the memory and executable by the processor, wherein when executing the computer program, the processor is configured to perform the computer program to implement the method for controlling a multi-mover direct drive transmission system as described in claim 1.

10. A non-transitory storage medium storing a computer program, wherein when executed by a processor, the computer program causes the processor to perform the computer program to implement the method for controlling a multi-mover direct drive transmission system as described in claim 1.

* * * * *